United States Patent

[11] 3,582,631

[72] Inventor Johannes E. Rijnsdorp
 Amsterdam, Netherlands
[21] Appl. No. 827,192
[22] Filed May 23, 1969
[45] Patented June 1, 1971
[73] Assignee Shell Oil Company
 New York, N.Y.

[54] CONTROL OF A PROCESS VARIABLE BY MEANS OF COMPUTER
 5 Claims, 6 Drawing Figs.
[52] U.S. Cl............................................................ 235/151.1
[51] Int. Cl................................................................. G05b 13/02
[50] Field of Search............................................. 235/151.1, 151.12, 151

[56] References Cited
 UNITED STATES PATENTS
3,129,323 4/1964 Stout et al...................... 235/151.1
3,517,170 6/1970 Banham, Jr................... 235/151.12

Primary Examiner—Eugene G. Botz
Attorneys—Freling E. Baker and J. H. McCarthy

ABSTRACT: A method and apparatus for automatically controlling a process variable wherein intermittent digital computer control and continuous control are employed in parallel. A condition of the process is measured and the measured value supplied to a computer which on the basis of this value calculates a desired setting of a correcting unit and intermittently produces a signal representing the calculated condition. The controlling signal is the output of an operational amplifier fed back by means of a capacitance. The controlling signal is changed by electrical charge added or subtracted from the capacitor. The change may be caused intermittently by the computer. But, also a continuous electrical signal corresponding to the measured value of the process variable is supplied to the input of the operational amplifier via an impedance which behaves like a capacitor at least with respect to direct current.

INVENTOR:
JOHANNES E. RIJNSDORP
BY:

HIS ATTORNEY

CONTROL OF A PROCESS VARIABLE BY MEANS OF COMPUTER

BACKGROUND OF THE INVENTION

The present invention relates to a method for automatically controlling a process variable (A) in a system comprising a digital computer for the control of a number of process variables, by which method the condition A is measured and the measured value is supplied to the computer, which inter alia on the basis of this value calculates the desired setting or adjustment (calculated condition) of a correcting unit (by means of which A can be influenced) and intermittently produces a signal representing this calculated condition, which signal is used for controlling the correcting unit. The invention also relates to a system for controlling the process variable (A).

In a control of this type two problems may be encountered. The first arises assessing the repetition frequency at which the computer calculates and produces the intermittent signal used for controlling the correcting unit. To ensure a sufficiently smooth control and a sufficiently quick response thereof to changes in the controlled condition a certain minimum value should be adhered to in assessing this frequency. It often happens, however, that the repetition period, even at this minimum frequency, is too short for the computer to carry out the desired calculations. In this case either the demands regarding calculations or quality of the control should be moderated, or else a faster computer should be acquired. Secondly, it is often necessary that some form of control be retained for a number of process variables if the computer fails or has to be taken out of operation.

The present invention now makes it possible to use a lower repetition frequency than before without thereby impairing the quality of the control. The longer repetition period involved is in many cases sufficient for the computer to carry out the desired calculations. Moreover, the invention makes it possible to maintain an emergency control system by the use of simple means when the computer is out of operation.

SUMMARY OF THE INVENTION

To this end, according to the invention a change is imparted intermittently to the output voltage of an operational amplifier fed back by means of a capacitance, which change is in accordance with the calculated setting or adjustment of the correcting unit, for which purpose the signal intermittently produced by the computer is supplied to the amplifier. Further, at least between the emissions of this signal, an electrical signal corresponding with the measured value of A is supplied for some time to the input of the operational amplifier via an impedance which behaves like a capacitor at least in respect to direct current; moreover, the output signal of the operational amplifier is supplied as a control signal to the correcting unit.

The changes in the control signal are thus determined by two signals derived from the controlled condition A and supplied to the amplifier:

These signals are:
1. the intermittent signal produced by the computer, and
2. the measured value of A, which is supplied via the impedance.

In calculating the intermittent signal, which represents the desired setting or adjustment of the correcting unit, the computer will as a rule start from the difference between the measured value and the desired value of A. To this end the latter value or at least sufficient data for the calculation thereof should be supplied to the computer or be available in the memory of the computer.

In some cases the changes in the control signal effected via the computer and via the impedance can assume zero value. As far as the impedance is concerned, this happens for example when condition A is constant; as far as the computer is concerned when the calculated setting of the correcting unit corresponds with the actual setting or when the calculated adjustment of the correcting unit is zero.

In the method according to the invention the signal supplied via the impedance is utilized to effect a change in the control signal during the periods in which the intermittent signal is absent. By an appropriate selection of the impedance and by supplying the measured value of A with the right sign to the impedance the control signal can be made to anticipate to an appreciable extent the value desired at the next action by the computer. That is, the signal supplied via the impedance is subtracted from the signal level calculated by the computer. As a result, when the next computer action takes place the change in the control signal can be smaller than would be the case if the control signal were to be determined by the computer alone. In this way the control signal responds more rapidly and more smoothly to variations in A. This makes it possible to increase the time intervals of the intermittent signal, which results in the advantages involved.

In a specific instance the appropriate selection of the impedance as referred to above depends on the type of control which it is desired to achieve. As a rule an acceptable result is already obtained by ensuring that the response of the control signal to variations in A corresponds with that of a suitable controller. However, the impedance must not be selected in such a manner that integration of A occurs via the combination of the impedance and the feedback amplifier. For, in the case of integral controller action it is essential that the difference between the measured and the desired value of A is integrated, rather than the measured value of A. Since this does not happen with the combination mentioned above, a control signal produced therein by integration would strongly deviate from a control signal suitable for control purposes. Accordingly, it would show variations which do not anticipate the value desired when the computer comes into action, and is therefore unsuitable for the envisaged control. Such an unsuitable control signal is avoided by selecting in accordance with the invention an impedance which behaves like a capacitor at least in respect of direct current.

The signal which corresponds with the measured value of A is supplied preferably uninterruptedly via the impedance to the amplifier. However, this supply may be interrupted, if desired, in the rhythm of the signal produced intermittently by the computer, provided the supply via the impedance takes place for some time between the (successive) emissions of the intermittent signal. While detracting from the improvement in the smoothness of the control signal, these interruptions may have inherent advantages for the control equipment to be used which offset this drawback.

When the supply to the operational amplifier of the signal intermittently produced by the computer is interrupted for a longer time, which may be the case, for example when a failure develops in the computer, the control signal nevertheless continues to be influenced by A via the impedance. This ensures a certain degree of control of A, starting from the situation after the last action of the computer. This is the emergency control referred to hereinbefore.

A system suitable for carrying out the method of the invention comprises:

a meter/signal generator for condition A;

a correcting unit by means of which condition A can be directly or indirectly influenced; and a digital computer, one input of which is connected with the output of the meter/signal generator and which computer is suitable for intermittently calculating and producing a signal representing the correcting unit's desired setting or adjustment as based in part on the measured value of A, and is characterized by a. an operational amplifier fed back by means of a capacitance;

b. a second capacitance which can be connected alternately with the output of the computer and with the input of the amplifier by means of computer-operated switching elements;

c. an electrical impedance which behaves like a capacitor at least in respect of direct current and which is connected between the output of the meter/signal generator and the input of the amplifier; and d. a connection between the output of the amplifier and the input of the correcting unit.

With this arrangement, the second capacitance receives a charge from the computer each time it is connected with the output of the computer, the value of this charge representing the calculated adjustment of the correcting unit. When the capacitance is connected with the input of the amplifier, this charge is completely or substantially completely transferred to the capacitance which provides the feedback for the amplifier, the output voltage of the amplifier undergoing a change. For the second capacitance a fixed capacitance may be used which is charged to a variable voltage. It is also possible, however, to take a variable capacitance, which is charged to a fixed voltage.

Another system, likewise suitable for carrying out the method according to the invention, is obtained by substituting for the circuit part referred to under (b) in the system described above a resistance capable of connecting the output of the computer with the input of the amplifier, a second resistance capable of connecting the output of the amplifier with its input, and computer-operated switching elements by means of which these connections can be established and interrupted.

With this system the computer each time supplies a voltage, the value of which represents the calculated setting of the correcting unit. Whenever the above connections are made, this voltage (multiplied by a negative constant) is transferred to the output of the amplifier, where it continues to exist after the connections have been broken, at least as long as the signal supplied via the impedance does not call for a change.

In most cases the computer, which forms part of the systems described above will be used not only for controlling the process variable A but also for other tasks, such as, for example, in controlling other process variables, or as a part of alarm or safety systems, etc. In this case the computer will also form part of other devices.

To be able to eliminate the influence of the computer in a simple manner while retaining the emergency mentioned previously—which may be of importance, for example in the event of failure of the computer—, it is desirable to provide the devices described with switching elements suitable for manual or automatic (e.g., by a safety system) operation by means of which elements the supply of the computer's output signal to the amplifier can be interrupted.

The term "correcting unit" as used herein denotes an element by means of which the value of the controlled process variable (A) can be directly or indirectly influenced and which can be operated by means of a control signal. The correcting unit may be, for example:

a control valve, a control valve provided with a valve positioner, rheostat or regulating transformer operated by a servosystem, a control system for one of the process variables, etc.

BRIEF DESCRIPTION OF THE DRAWING

The invention is further elucidated with reference to the figures, in which.

DESCRIPTION OF PREFERRED EMBODIMENTS

Figure 1:
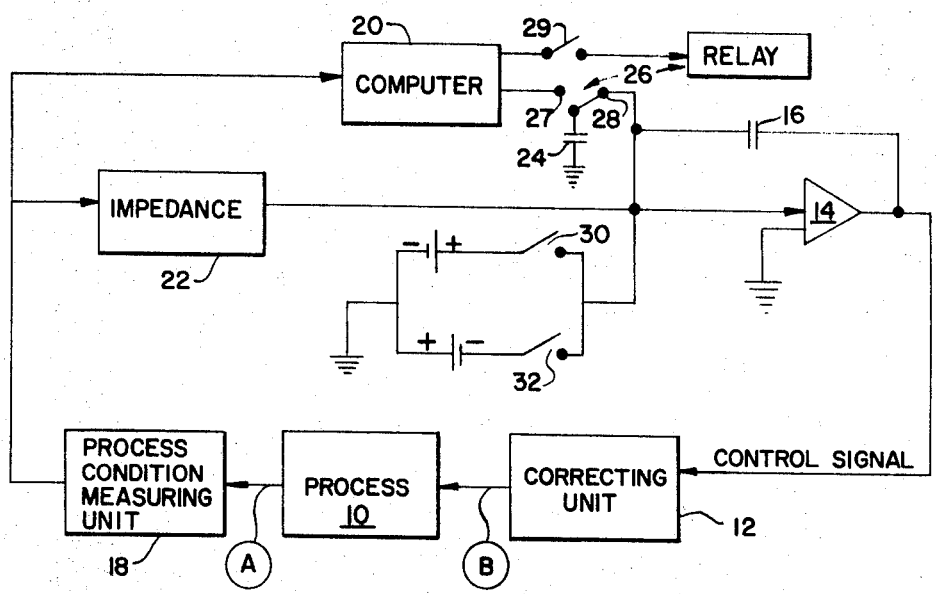
FIG. 1 is a diagrammatic representation of a system according to the invention.

FIG. 1 gives a diagrammatic representation of a process 10, one of the process conditions (A) of which is controlled in accordance with the invention. The value of A can be influenced by modifying the setting B of a correcting unit 12. To achieve this, a voltage V is supplied as control signal to the correcting unit 12. This voltage is derived from the output of an operational amplifier 14 fed back by means of a capacitor 16. By operational amplifier is understood an amplifier with a very high input impedance and a very high negative gain. An operational amplifier thus fed back retains its output voltage if no signals are supplied to its input and thus acts as a signal-sustaining means.

For control purposes the process condition A is measured by a meter/signal generator 18, the output signal of which (representing the measured value of A) is supplied to a computer 20 and an impedance 22. On the basis of inter alia, the measured value of A, the computer calculates the desired adjustment of the correcting unit 12 and generates a voltage corresponding therewith. This voltage is transferred to a capacitor 24 via a relay switch 26 having position 27 and 28. By placing switch 26 in the position 28, the capacitor 24 is connected with the input of amplifier 14. Capacitor 24 then discharges completely or substantially completely, its charge being transferred to the capacitor 16. At the same time the control signal V undergoes a change corresponding with the calculated adjustment, as a result of which the setting of the correcting unit 12 changes. After the discharge of the capacitor 24, the switch 26 is returned to position 27.

The calculation by the computer of the desired adjustment takes place intermittently, often alternatively with other calculations (for example for the control of other process conditions). To ensure that capacitor 24 is charged and discharged at the right moment the relay switch 26 is controlled by the computer. In this way the adjustment of the correcting unit is effected intermittently.

Moreover, since the measured value of A is supplied to the impedance 22, which is also connected with the input of the amplifier 14, a continuous change of V can take place, which happens mainly between the successive intermittent changes caused by computer 20.

When it is desired to control A by a system with, for instance, proportional plus integral control action, it is possible to use a capacitor for the impedance 22. The proportional action is then attained by means of the continuous changes in V. In this case the computer need only calculate the adjustment of the correcting unit as required for the integral action, which adjustment is then effected intermittently, as described above. Thus V changes more gradually than would be the case if the proportional action were likewise established via the computer instead of via the impedance. Consequently, the time interval between the intermittent changes can take longer. Moreover, the computer is relieved of the calculations for the proportional action.

The computer may calculate the desired adjustment of the correcting unit directly or as the difference between the desired setting and the actual setting. In the latter case the value of this setting (to be measured for the purpose) or, if desired, the voltage V, should be supplied to the computer (this is not shown in FIG. 1). The computer is now required to calculate the desired setting *completely;* if also in this case proportional plus integral control action is desired, the desired setting B based on *both* control actions must be calculated. Here again it is possible to take a capacitor for the impedance 22 if it is desired for the proportional control action to be reflected already in the continuous variations of the control signal. However, by using for the impedance 22 one of the circuits drawn in FIGS. 2a, 2b, 2c and 2d, an even better result is obtained. In fact the control signal then anticipates the value calculated by the computer more closely.

FIG. 1 further shows a switch 29, by means of which the control of relay 26 by computer 20 can be interrupted, leaving only the continuous changes of V. These still ensure a certain degree of control, which starts from the situation after the last intermittent change. It is desirable to cause the switch 26 to be operated by a safety system capable of detecting incorrect functioning of the computer; the possibility of manual operation is also useful.

By means of a switch 30 or 32 a source of either positive or negative direct current may be temporarily connected to the input of the amplifier in order to change V in a positive or negative sense, with the automatic control system being bypassed. If for the impedance 22 use is made of one of the circuits represented in FIGS. 2a to 2d, all of which contain a resistance 16, it is—in deviation from FIG. 1—also possible to supply the direct current to the amplifier via this resistance.

Figure 3:
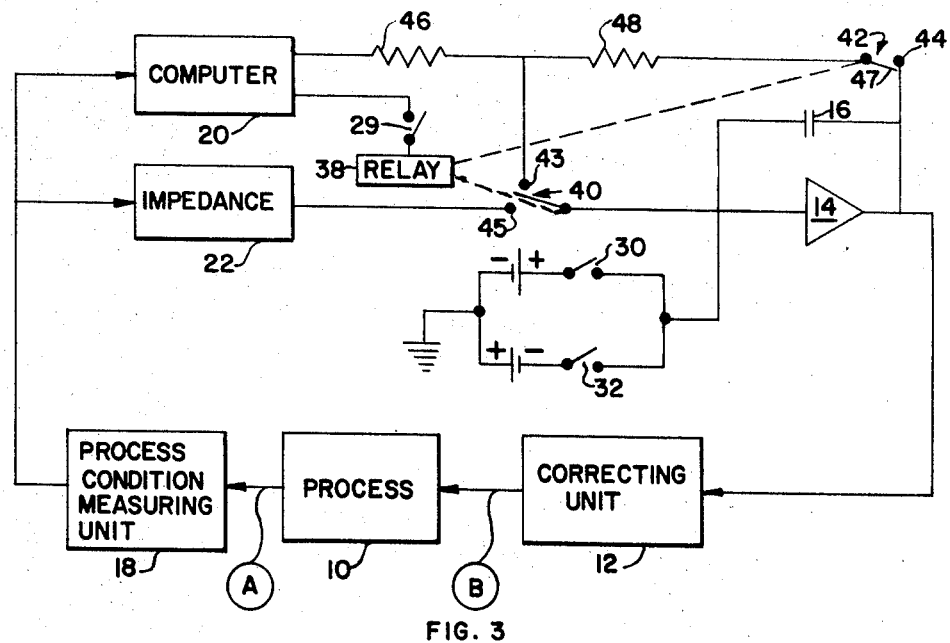
FIG. 3 is a diagrammatic representation of another embodiment of a system according to the invention.
Figure 2A:
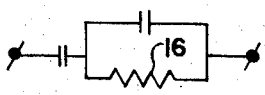
FIG. 2a, 2b, 2c and 2d show a few embodiments of the impedance.
Figure 2B:
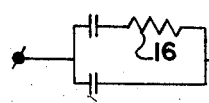
Figure 2C:
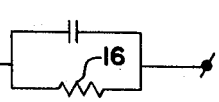
Figure 2D:
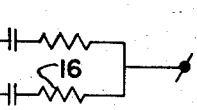

The output voltage V of the feedback amplifier 14 can also be influenced by the computer in a manner different from that shown in FIG. 1. An example is shown in FIG. 3. Contrary to FIG. 1 the relay coil 38 now operates two switches, 40 and 42, simultaneously as illustrated by the dashed lines. When V is to be changed by the computer, the latter brings these switches 40 and 42 in the positions 43 and 44 respectively for a short time, by means of the relay coil 38. The voltage generated by the computer is now transferred via a resistance 46 to the input of the amplifier 14, whilst a resistance 48 is connected in parallel to the capacitor. In this circuit the amplifier 14 functions as a slightly delayed phase-inverter amplifier. The delay which is determined by the product of the values of the resistance 48 and the capacitor 16 is kept small by an appropriate choice of these values. As a result the voltage V rapidly assumes the value envisaged. The switches 40 and 42 are subsequently returned to the positions 45 and 47. With this method the computer should always produce a voltage which corresponds with the desired setting of the correcting unit 12. If the computer primarily calculates the desired adjustment, it will have to add thereto the actual value of the setting. For this purpose V or the measured value of B should be supplied to the computer. The change of V in the time interval between two successive changes calculated by the computer which change is caused via the impedance yields the desired less uneven course of V also in this embodiment of the invention.

When in the apparatus of FIG. 3 the switch 29 is opened in order to eliminate the influence of the computer while retaining the emergency control mentioned previously, the relay switches 40 and 42 are in the positions 45 and 47.

I claim as my invention:

1. In a method of controlling a process by digital computer wherein said computer samples an output of said process and intermittently generates an output signal that is sustained and applied to a controller of said process, the steps of:
    measuring the output of said process;
    generating a continuous signal proportional to said measured output;
    subtracting said continuous signal from said sustained computer output signal to produce a control signal; and,
    supplying said control signal to the controller of said process.

2. A system for the automatic control of a process condition, comprising:
    means for measuring said process condition, said means being operatively connected to said process and adapted to generate an output signal proportional to said process condition;
    a digital computer, said computer operatively connected to said condition measuring means; and adapted for periodically generating an output signal to be used in controlling said process condition;
    signal sustaining means, said means having an input operatively connected to an output of said computer and adapted to maintain the signal level supplied thereto from said computer;
    impedance means connected between said process measuring means and said signal sustaining means whereby said output signal of said process measuring means is supplied to said signal sustaining means; and
    controlling means, said controlling means having an input operatively connected to said signal sustaining means and an output operatively connected to said process, whereby said condition of said process is modified according to the signal on said input.

3. The system of claim 2 wherein said sustaining means comprises an operational amplifier having its output fed back to an input via a capacitor.

4. The system of claim 2 wherein a switching means is supplied between said computer and said sustaining means, by means of which the supply of the computer's output signal to the sustaining means may be interrupted.

5. The system according to claim 2 further characterized by a source of positive and negative DC power connected through respective switches to the input of said operational amplifier whereby a constant DC signal may be maintained at the input of said amplifier.